UNITED STATES PATENT OFFICE.

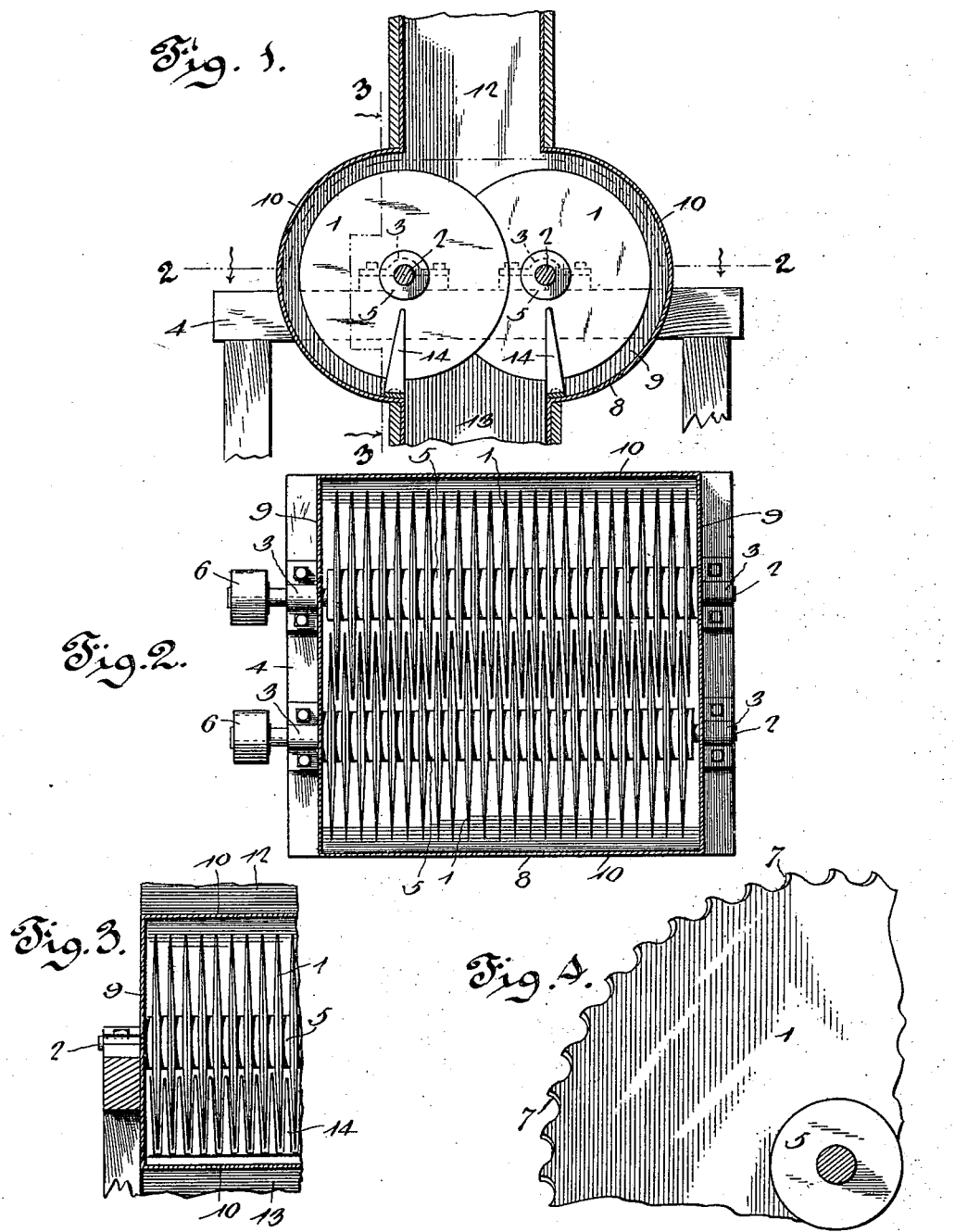

ELIAS A. STARE, OF WAUKESHA, WISCONSIN.

CORN-CUTTER.

SPECIFICATION forming part of Letters Patent No. 692,940, dated February 11, 1902.

Application filed August 17, 1900. Serial No. 27,198. (No model.)

*To all whom it may concern:*

Be it known that I, ELIAS A. STARE, a citizen of the United States, residing at Waukesha, in the county of Waukesha and State of Wisconsin, have invented a new and useful Corn-Cutter, of which the following is a specification.

The invention relates to improvements in cutters.

The object of the present invention is to improve the construction of cutters and to provide a simple, inexpensive, and efficient one designed for operating on green corn after the same has left the machine for removing the corn-silk and capable of cutting the kernel into pieces of uniform size, so that the contents of cans will present a uniform appearance.

The invention consists in the construction and novel combination and arrangement of parts hereinafter fully described, illustrated in the accompanying drawings, and pointed out in the claim hereto appended.

In the drawings, Figure 1 is a vertical sectional view of a corn-cutter constructed in accordance with this invention. Fig. 2 is a horizontal sectional view on line 2 2 of Fig. 1. Fig. 3 is a vertical sectional view on line 3 3 of Fig. 1. Fig. 4 is a detail view of a tooth-cutter or saw.

Like numerals of reference designate corresponding parts in all the figures of the drawings.

1 1 designate series of cutters consisting of circular blades or disks having peripheral cutting edges and mounted on parallel shafts 2 and designed to operate on corn after the same has been cut from the cob and after the corn-silk has been removed and capable of reducing the kernels to a uniform size, so that after corn has been placed in cans it will present a uniform appearance as to size. The parallel shafts are journaled in suitable bearings 3 of a supporting-frame 4, and the rotary cutters, which are arranged at intervals on the shafts, are spaced apart by washers 5, and the blades overlap, the blades of one series projecting into the intervals of the blades of the other series, as clearly illustrated in Fig. 2 of the accompanying drawings. Any desired number of knives may be employed, and they may be constructed of any size; but they are preferably made one-sixteenth of an inch thick, with spacing-washers three-sixteenths of an inch thick, so that when the knives are assembled there will be one-sixteenth of an inch between them. The shafts are extended beyond one end of the frame, and they are provided with pulleys 6, and the rotary cutters are designed to be driven at a high rate of speed toward each other, so that the material will be rapidly recut and reduced to uniform size. The knives or cutters may have continuous cutting edges, as illustrated in Fig. 1 of the accompanying drawings, or they may be provided with cutting-teeth 7, as illustrated in Fig. 4 of the drawings.

The cutters are arranged within the casing 8, composed of straight ends 9 and approximately semicylindrical sides 10, conforming to the configuration of the rotary cutters and spaced therefrom, as clearly shown in Fig. 1 of the drawings. The casing, which is provided at its top and bottom with openings, has its upper opening communicating with a feed-chute 12 and its lower opening communicates with a discharge-chute 13. These chutes are preferably constructed of wood and are provided with an inner lining of sheet metal, such as galvanized iron or other suitable material, and the casing, which is also preferably constructed of sheet metal, prevents the material from scattering and the juice from escaping. The upper chute is designed to receive the corn after the same has been cut from the cob and after it has passed through a machine for removing the corn-silk, and the lower chute is designed to deliver the corn into suitable receptacles after it has been recut into kernels of uniform size.

The rotary cutters are cleaned by combs 14, located beneath the shafts and mounted upon the bottom portions of the casing, as clearly illustrated in Figs 1 and 3 of the drawings. The teeth of the combs extend upward between the cutters and are adapted to remove any of the material adhering to the same, and such material that is scraped from the cutters falls into the discharge-chute. The rotary cutters taper toward their peripheral cutting edges, and the combs, which extend upward at opposite sides of the lower chute, are provided with tapering teeth, which are arranged in the tapering spaces between the cutters, as clearly illustrated in Fig. 3 of the accompanying drawings.

It will be seen that the machine, which is simple and comparatively inexpensive in construction, is adapted for recutting corn into kernels of uniform size, so that the contents of cans will present a uniform appearance, and that the material is rapidly operated on and prevented from clinging to the knives and interfering with the operation of the same. It will also be apparent that the casing prevents the material from scattering and retains the juice and directs the same into the discharge-chute.

The vertical combs coöperate with the upper and lower vertical chutes and provide practically a continuous vertical chute or passage to cause the material to pass rapidly through the cutter and to prevent the said material from being carried upward by the rotary cutters.

Changes in the form, proportion, size, and the minor details of construction within the scope of the appended claim may be resorted to without departing from the spirit or sacrificing any of the advantages of this invention.

What is claimed is—

In a machine of the class described, the combination of the parallel horizontal cutter-shafts, the horizontal series of rotary cutters mounted upon the shafts and having overlapping portions and being tapered from their centers to their peripheries and having inwardly-tapered spaces between them, the inwardly-tapered spaces of one series of cutters receiving the overlapping portions of the other series of cutters, the casing provided with the opposite semicylindrical portions and having the upper and lower centrally-arranged vertical chutes 12 and 13 having their end walls arranged in the same vertical planes as the shafts, and the vertical combs arranged in the same planes as the end walls of the chutes and forming continuations of the walls of the lower chute and extending therefrom to points directly beneath the cutter-shaft, substantially as and for the purpose described.

In testimony that I claim the foregoing as my own I have hereto affixed my signature in the presence of two witnesses.

ELIAS A. STARE.

Witnesses:
   HARVEY J. FRAME,
   A. L. BLACKSTONE.